United States Patent [19]

Tanaka

[11] 4,283,816
[45] Aug. 18, 1981

[54] BINDING DEVICE

[75] Inventor: Toshie Tanaka, Machida, Japan

[73] Assignee: Nifco Inc., Yokohama, Japan

[21] Appl. No.: 130,893

[22] Filed: Mar. 17, 1980

[30] Foreign Application Priority Data

Mar. 26, 1979 [JP] Japan .................................. 54/37820

[51] Int. Cl.³ ............................................ B65D 63/00
[52] U.S. Cl. .................................... 24/269; 24/16 PB; 248/74 PB
[58] Field of Search ...................... 24/16 PB, 269, 273, 24/275; 248/74 PB

[56] References Cited

U.S. PATENT DOCUMENTS

| | | | |
|---|---|---|---|
| 1,874,731 | 8/1932 | Younce | 24/269 UX |
| 3,513,508 | 5/1970 | Modéme | 24/16 PB |
| 3,840,018 | 10/1974 | Heifetz | 24/16 PB X |
| 3,962,759 | 6/1976 | Nagai | 24/269 |
| 4,024,604 | 5/1977 | Klimek et al. | 248/74 PB X |
| 4,047,268 | 9/1977 | Buttriss | 24/16 PB X |

*Primary Examiner*—Ramon S. Britts
*Assistant Examiner*—Peter A. Aschenbrenner
*Attorney, Agent, or Firm*—J. R. Halvorsen; T. W. Buckman

[57] ABSTRACT

A binding device comprises a band with fastening steps, a fastening member having a round hole formed integrally with one end of the band, a shaft member formed integrally with the other end of the band, and fastening means provided on the fastening member to engage the fastening steps on the band. In use, the band is wrapped about the article to be bound and the shaft member is inserted into the round hole of the fastening member. The shaft member is then rotated to tighten the band and the band is retained at the desired degree of tightness by the engagement between fastening means on the fastening member and the fastening steps.

4 Claims, 9 Drawing Figures

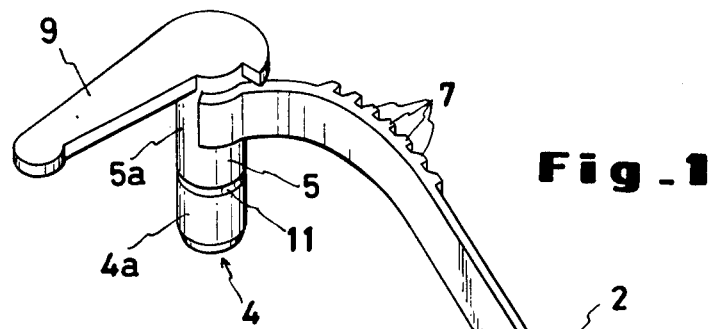
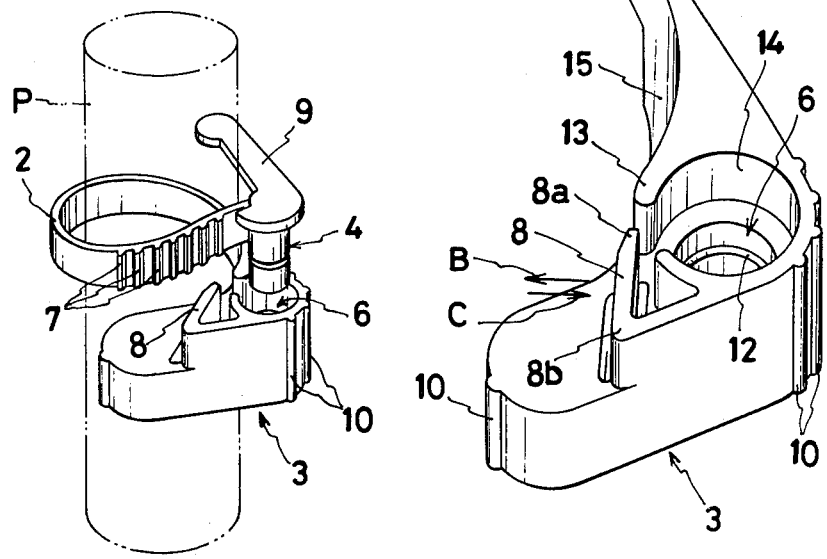

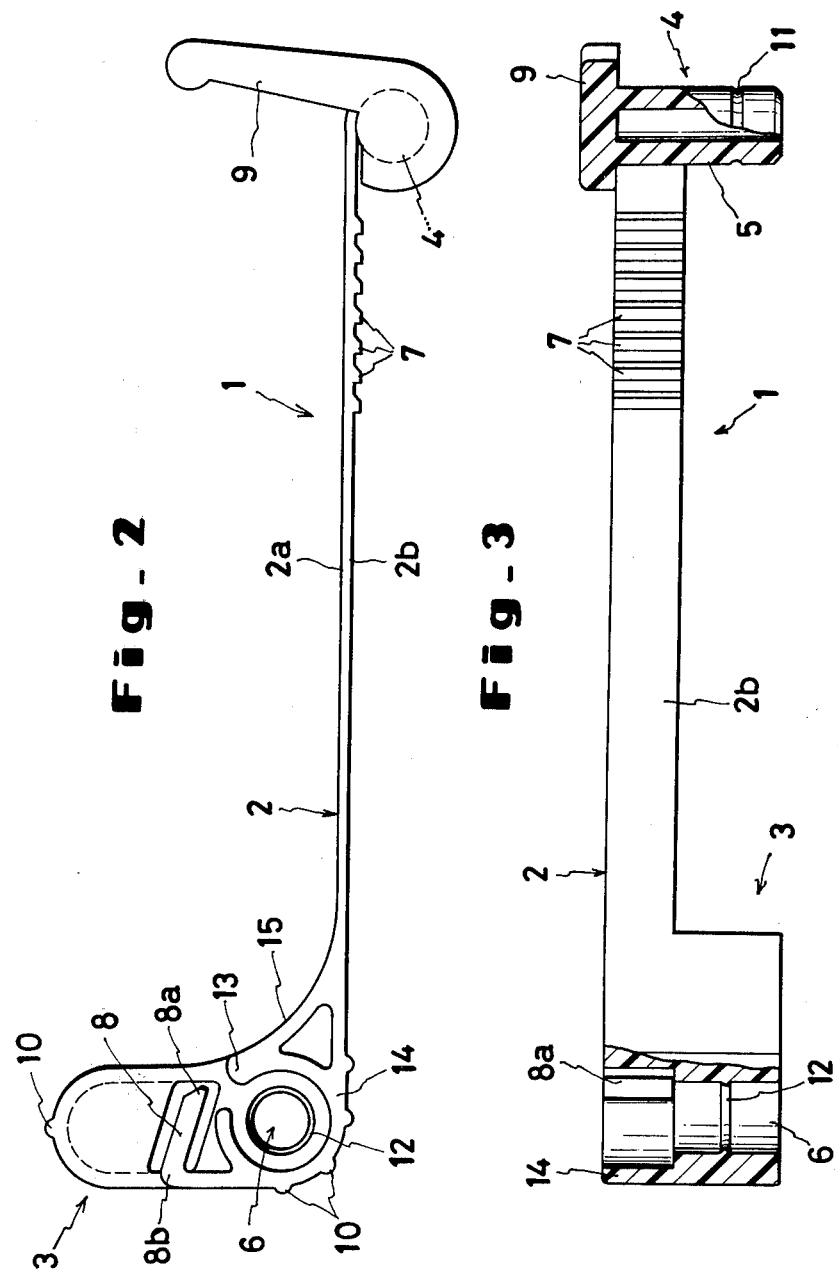

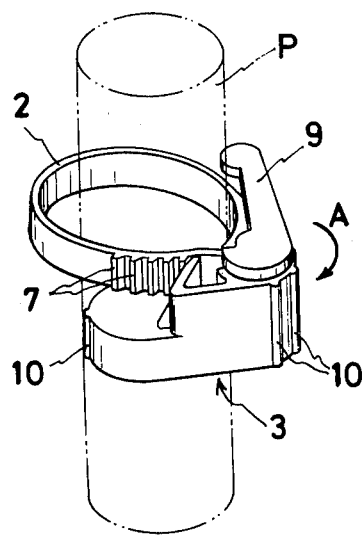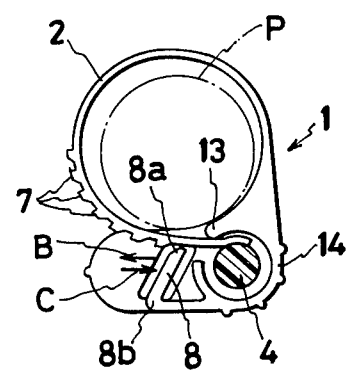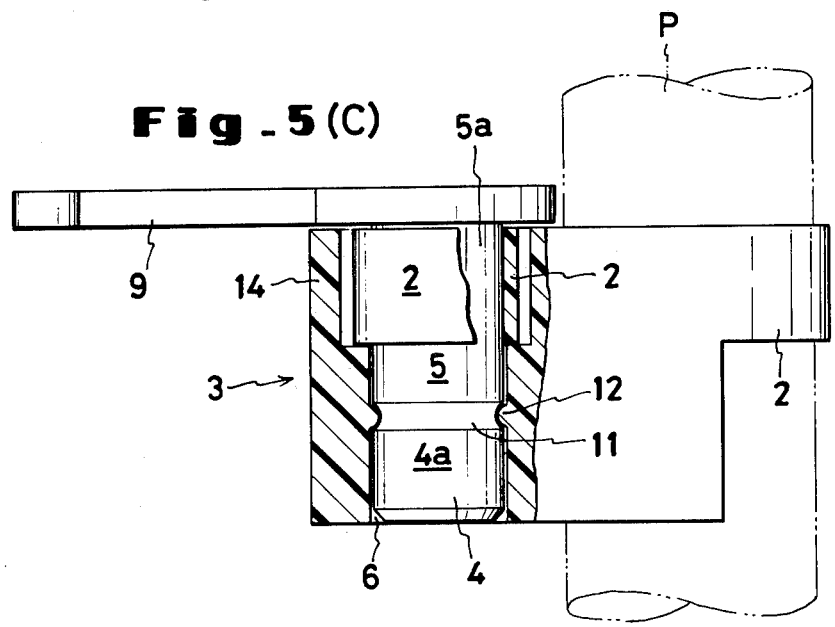

Fig_6 (A)
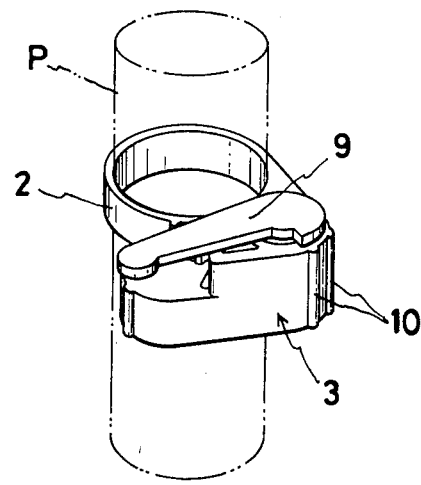
Fig_6 (B)
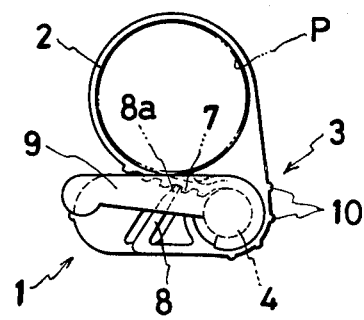

BINDING DEVICE

BACKGROUND OF THE INVENTION

This invention relates to a plastic binding device of the type to be used on a joint in a hose for the purpose of ensuring safe union of the two joined ends or on a plurality of electric cables or pipes for the purpose of tightly bundling them together.

Numerous binding devices have been developed to date for such purposes. By material, they can be grouped under two categories: those made of metals and those made of plastics. Generally, when a hose is attached to the cock of a gas or water pipe or to the inlet or outlet of a radiator in an automobile, for example, a binding device which incorporates a metal band capable of providing relatively high binding force is preferably used around the terminal portion of the hose for the purpose of ensuring perfect union of the hose to the cock or to the inlet or outlet. For the purpose of binding a plurality of electric cables, etc. into a tight bundle, a plastic binding device incorporating a plastic band which enjoys low cost and high moldability is adopted.

A binding device made of plastic material which is inexpensive, easy to mold, resistant to corrosion and capable of providing high binding strength will find utility in various applications without reference to the type of objects on which the binding device is to be used.

From this point of view, it is seen that ordinary conventional plastic binding devices comprise a band adapted to be wrapped around the article subjected to binding such as hoses, electric cables and pipes, and a fastening member. One end of the band is generally attached integrally to the fastening member. On the other hand, the fastening member is provided with a fastening hole for permitting insertion of the other end, namely the free end, of the band. Inside the fastening hole is disposed a check claw or some other suitable fastening means adapted to be engaged with a complementary fastening member disposed on the band side. Such is the construction found in most conventional binding devices.

To increase the force with which the band is wrapped around the article, after the band has been wound around the article, inserted through the fastening hole and allowed to protrude from the opposite side of the fastening hole, the worker is required to firmly grasp the free protruding end of the band with his finger tips or a suitable tool and give it a forceful pull. The work of pulling, by nature, is such that the manner in which the force is exerted upon the free end of the band cannot be accurately adjusted as one wishes. Thus, some allowance must be given to the increase of force which is actually effected on the band. Apart from the problem of the fastening force (binding force), the workability of the fastening device itself which relies upon such manual pulling does not prove to be highly desirable. Particularly in a limited space, this work of pulling is found to be extremely difficult.

The object of this invention is to provide a plastic binding device which readily provides necessary binding force and permits the binding work to be accomplished with ease.

SUMMARY OF THE INVENTION

To accomplish the object described above according to the present invention, there is provided a plastic binding device which comprises a band provided with a row of fastening steps, a fastening member integrally connected to one end of the aforementioned band and provided with a round hole, a shaft member integrally connected to the other end of the aforementioned band and adapted to fit into the round hole of the fastening member, and fastening means disposed in the fastening member and adapted to come into checked engagement with the aforementioned row of fastening steps.

With the plastic binding device possessing such a construction as described above, desired binding of a given article is accomplished by first wrapping the band around the article, inserting the shaft member into the round hole in the fastening member, bringing the fastening steps into checked engagement with the fastening means and rotating the shaft member around its axis in the direction in which the band is wound on the shaft member and the diameter of the band wrapped around the article is gradually decreased. Once the desired binding is obtained, the shaft member may be released. Since the band and the fastening member are held in a checked engagement, their union is not broken by the release of the shaft member. As described above, the binding device of this invention readily permits desired binding of the article by rotating the shaft member in one fixed direction. Moreover, the binding device of the present invention is easily produced because it can be integrally molded of a plastic material in a simple die.

The other objects and characteristics of the present invention will become apparent from the further disclosure of the invention which will be made hereinafter with reference to the accompanying drawing.

BRIEF EXPLANATION OF THE DRAWING

FIG. 1 is a perspective view of one preferred embodiment of the binding device according to the present invention.

FIG. 2 is a plan view of the binding device of FIG. 1.

FIG. 3 is a partially sectioned side view of the binding device of FIG. 1.

FIG. 4 is a perspective view illustrating the binding device of FIG. 1 in a state wherein the band thereof has already been wound around an article and the shaft member and the fastening member thereof are on the verge of entering into mutual engagement.

FIG. 5(A) is a perspective view illustrating the binding device of FIG. 1 in a state wherein the band thereof has already been wound around the article and the shaft member and the fastening member thereof have already been brought into engagement.

FIG. 5(B) is a partially sectioned plan view of the binding device in the state of FIG. 5(A).

FIG. 5(C) is a partially cut-away enlarged side view of the binding device in the state of FIG. 5(A).

FIG. 6(A) is a perspective view illustrating the binding device of FIG. 1 in a state wherein the band thereof has already been wound around the article.

FIG. 6(B) is a plan view of the binding device in the state of FIG. 6(A).

DESCRIPTION OF PREFERRED EMBODIMENT

The binding device 1 according to the present invention, as in the embodiment illustrated in FIGS. 1-3, is integrally molded of a suitable plastic material. It possesses a band 2 which, as illustrated in FIGS. 4-6, is wound around an article P subjected to binding such as a bundle of electric cables, hoses or pipes and is tightened with increasing strength against the article as the diameter of the band wound on the article is decreased. At one end of this band 2, a fastening member 3 is integrally molded. To the remaining free end of this band 2 is integrally connected a shaft member 4. The shaft member 4 is adapted to be rotatable around its own axis so as to wind up on itself the free end side of the band 2 which has been annularly wrapped around the periphery of the article, decrease gradually the diameter of the ring of the band on the article and tighten up the band against the article. For the purpose of distinction, the surface of the band 2 which is exposed to direct contact with the article is called the "inner surface" 2a and the surface on the opposite side the "outer surface" 2b, respectively. In the present case, the portion of the shaft member 4 to which the free end of the band 2 is connected forms one portion of the upper half surface 5a of the circumference of the shaft member 4 on the side of the outer surface 2b of the band 2.

For the shaft member 4 to provide the aforementioned rotation about its own axis, the lower half portion 4a of the shaft member 4 is adapted to be inserted into a round hole 6 which is perforated in the fastening member 3 in a direction substantially perpendicular to the direction in which the band is stretched.

The principal component members of the binding device of the present invention have been described. Now, the operation of binding by use of this binding device will be described with reference to FIGS. 4-6 and, at the same time, the other members which are necessary for the completion of the binding device will be described.

First, the band 4 is wound around the article P subjected to bundling or binding and the shaft member 4 is brought to and poised over the round hole 6 in the fastening member 3 as illustrated in FIG. 4. During this step of operation, therefore, the band 2 assumes a spirally twisted state relative to the axial direction of the article P. After the shaft member 4 has been inserted fully into the round hole 6, the band 2 assumes the shape of a ring describing a circle substantially in one plane around the periphery of the article P (FIG. 5(A)).

At this point, the band 2 is loosely wrapped around the article P and does not tightly bind the article. Then, as the shaft member 4 is rotated about its own axis to wind up the band 2 on itself, the length of the band 2 wound around the article P is gradually decreased and the diameter of the aforementioned ring of the band is proportionally decreased, with the result that the band tightens itself against the periphery of the article (FIG. 6). After the fastening member has produced a suitable degree of binding, it is required to maintain that state intact. For this purpose, the band 2 is provided on one surface thereof with a row of a suitable number of properly spaced fastening steps 7 and, on the other hand, the fastening member 3 is provided at a proper position with fastening means adapted to come into checked engagement with the fastening steps 7.

In the case of the illustrated binding device, these fastening steps 7 are formed in the shape of a corrugation containing seven ridges on the outer surface 2b of the band 2 in a zone closer toward the shaft member 4.

The fastening means 8 which serves to establish fast engagement with the fastening steps is formed in the shape of a claw sharp enough to hook the lateral side of one of the ridges, namely the fastening steps 7 on the band, at a small distance from the round hole 6 for admitting the shaft member. In the present embodiment, the fastening means 8 is constituted of an L-shaped arm member 8b having one of its ends integrally attached to the fastening member 3 and its other free end 8a formed to constitute a claw for engagement with the fastening steps 7. In the present case, therefore, this fastening means 8 enjoys a certain degree of flexibility at the side of the pointed edge 8a which forms the claw.

After the binding device has been set in position as illustrated in FIG. 5(A), the shaft member 4 is rotated in the direction of the arrow "A" to have the adjoining portion of the band wound up thereon (FIGS. 5(B) and 5(C)). Consequently, the fastening steps 7 on the band 2 ride over the fastening means 8 successively from the foremost step backwardly by virtue of the elasticity possessed by the steps themselves and the elasticity and flexibility possessed by the fastening means 8 until the band applies a proper tightening force on the article. After the article has been bound with ample tightness, the rotation of the shaft member 4 is stopped. As a result, the last of the fastening steps 7 which has ridden over the pointed edge 8a of the fastening means 8 is brought into checked engagement with the pointed edge 8a. Thus, the required binding of the article by the binding device is completed (FIGS. 6(A) and 6(B)).

The basic construction and operation of the binding device of this invention have been described. The present embodiment of the binding device is provided with an additional constructional feature as described herein below.

First for the purpose of facilitating the rotation of the shaft member 4 with finger tips or a proper tool, the shaft member 4 is provided with a lever-like handle 9 extending in a radial direction from the upper end of the shaft member. The user, therefore, can rotate the shaft member 4 by resting his finger tips on this handle 9 and giving it a pull. In this case, the exertion of force upon this lever-like handle 9 would be facilitated if the user's other hand could be used to firmly grip the fastening member 3. In this respect, suitable knurls 10 formed on the outer surface of the fastening member 3 will ensure a firm grip on the fastening member 3 and aid advantageously in facilitating the rotation of the shaft member 4.

The handle 9 of the shape of a lever has been cited above by way of illustration. Optionally, the handle may be formed in some other shape such as, for example, in the shape of a disk. If this disk is intended to be rotated by use of an offset wrench or screw driver, then it may be formed in the shape of a nut or of a head containing a ridge or groove. Particularly the handle formed in the shape of a lever as in the present embodiment proves convenient for a binding device which is designed for use on an article P of a stated diameter. This is because the lever-like handle, when the band is wrapped around the article, falls within a very short distance from the article P and, therefore, cannot be rotated throughout the entire circumference of 360° about its axis. Another reason is that the binding device, for use on the article of a stated diameter, can be designed so that the lever-like handle will most closely approach the article P as illustrated in FIG. 6(B) when the band is fully tightened up and, as a result, the binding device itself will enjoy a high space factor after it has bound the article. As a natural consequence, the number of fastening steps 7 may be decreased to the minimum permissible (to just one step in an extreme case) and the length of the band may be shorted similarly.

Conversely when the binding device is intended to be used on an article P which, by nature, demands some allowance for diameter variation, the length of the band may be increased to a moderate extent and the number of fastening steps 7 may be proportionally increased. At the same time, the handle 9 for the shaft member 4 may be formed in the shape of a disk so that it can be freely rotated by more than one complete rotation and the diameter of the shaft member and that of the round hole for admitting the shaft member may be carefully fixed so as to allow for a wide variation in the length of the band to be wound up on the shaft member inside the round hole.

The binding device would fail to provide desired binding of the article P if the shaft member 4, while being rotated about its axis or after having been rotated to its full extent to provide the required binding force, slipped out of the round hole of the fastening member 3 on exposure to the impact such as of the twisting force exerted on the band. To avoid this trouble, the shaft member 4 once inserted into the round hole 6 must be prevented from slipping in the axial direction out of the round hole even after it is given freedom of rotation about its axis. This slippage may be prevented, for example, by forming an annular groove 11 in the periphery of the shaft member and a matched annular ridge 12 on the inner wall of the round hole as illustrated in FIG. 5(C) and, thereby, enabling the annular ridge 12 to snap into fast engagement with the annular groove 11 and establishing a first union between the shaft member and the round hole. Of course, the locations of the annular groove and the annular ridge may be reversed. No use is found for the snapping engagement of the groove and the ridge when the width of the band is increased so much as to preclude effectively the possible deviation of the shaft member relative to the axial direction of the article P.

To ensure perfect engagement of the fastening steps 7 of the band with the fastening means 8 of the fastening member 3, there may be provided a wall member 13 which serves to press the rear surface of the engaging portion of the band against the fastening means. In this case, this wall member 13 and the pointed edge 8a of the fastening means 8 form a slit barely permitting the passage of the width of the band 2. The periphery of the upper half portion of the shaft member on which the band is wound up is to be enclosed with an annular wall member 14 with the exception of the aforementioned slit. The general inside diameter of this annular wall member 14 is greater than the outer diameter of the shaft member plus the thickness of the band wound up as many turns as required on the shaft member.

In the fastening means 8 of the present embodiment since the distance between the pointed edge 8a and the point of attachment of the arm member 8b to the fastening member 3 is so large that the pointed edge 8a enjoys an ample rotary flexibility with the point of attachment of the arm member 8b to the fastening member 3 as the center. This rotary flexibility, therefore, permits release of the band from the engagement with the shaft member. When the lever-like handle 9 is rotated forcibly opposite its binding direction, the fastening means 8 is bent outwardly (in the direction of the arrow "B") by the leading edge of the band and the fastening steps 7 which have been caught by the pointed edge 8a begin to come loose to a point where the band is ready to fall off the article P. This release of the band may otherwise be obtained by preparatorily bending the fastening means inwardly (in the direction of the arrow "C") by the finger tips or a proper tool and thereby causing the fastening means to part from the engagement with the fastening steps 7 on the band, and thereafter rotating the shaft member 4 in the reverse direction. When the binding device 1 is desired to be brought back to its original state as illustrated in FIG. 1 after the band has been loosened as described above, all that is required is to pull the shaft member 4 forcibly from the round hole 6.

The fastening steps 7 provided on the band may optionally be formed on the inner surface side of the band instead of the outer surface side as illustrated on condition that they be formed in a position such that, when the band has been wrapped around the article, they will not come into contact with the article and interfere with the operation of binding. In this case, it is quite natural that the fastening means 8 on the fastening member should be disposed in the reverse direction relative to the illustrated direction. Further, the fastening steps 7 in the shape of a corrugation may be replaced by those formed of a row of dents such as perforations or blind holes. When a plurality of rows of fastening steps are desired to be formed over a fairly large portion of the entire length of the band for the purpose of heightening the adaptability of the binding device, it is advantageous to form such fastening steps in the shape of grooves lest the steps should interfere with tight engagement of the band with the article.

Further, for a particular application which contemplates safe release of the binding device from its engagement with the article, the fastening means 8 may be formed in the shape of a simple protuberance or, in the case of the fastening steps having the shape of ridges, it may be formed in the shape of a simple groove sufficient for admitting any of the plurality of ridges. In addition, the position at which the fastening means 8 is disposed may be selected such as in the part of the wall member 14 which serves to enclose the periphery of the shaft member on which the band is to be wound up. Optionally, the shaft member may be adapted so that it will be rotated in the opposite direction relative to the illustrated direction to bring the band into tight engagement with the article.

Further in the case of the illustrated embodiment, the fastening member 3 is provided with a curved-surface portion 15 which comes into intimate contact with the article P over a fairly large portion of the entire circumference of the article. This curved-surface portion 15 contributes to the ease of binding work and the stability of the union obtained by the binding. When the binding device is expected to offer high adaptability and to be used on articles of a fairly variable diameter, this curved-surface portion 15 may be omitted especially where the curvature of this portion 15 appreciably differs from that of the article.

When the binding device is to be used for tightening up the joint of hose ends, for example, good service thereof is advantageously obtained when the retailer preassembles the binding device in the form of a loose loop as illustrated in FIG. 5 at the time of sale and the user sets the preassembled binding device to one of the hose ends readied for union and, after the hose ends are bound to each other, causes the device to slide and cover the point where the two hose ends meet.

As described above, the present invention can provide a binding device which enables desired binding of the article with high strength by a simple binding operation consisting solely of rotating the shaft member, and which is free from all the shortcomings suffered by the conventional plastic binding devices. Further, the binding device of this invention has another advantage in that it can be integrally molded of a plastic material in a two-piece split die of a simple construction. Thus, it features great ease of manufacture and high adaptability to the article subjected to binding.

What is claimed is:

1. A binding device, comprising:
   a band provided on at least one surface thereof with fastening steps,
   a fastening member integrally connected to one end of said band and provided with a round hole,
   a shaft member having a portion thereof integrally connected to the other end of said band and adapted to be inserted into said round hole in said fastening member and rotated about its axis within said round hole, and
   a fastening means disposed on said fastening member and adapted to be brought into checked engagement with said fastening steps on said band when said shaft member is rotated and said band is wound up on said rotated shaft member.

2. The binding device according to claim 1, wherein said shaft member is provided with a handle adapted to facilitate the rotation of said shaft member.

3. The binding device according to claim 1, wherein the fastening means adapted to be brought into checked engagement with said fastening steps is provided with a pointed edge for making said engagement.

4. The binding device according to claim 3, wherein said pointed edge is flexible.

* * * * *